United States Patent [19]
Lawson

[11] 3,814,121
[45] June 4, 1974

[54] FLUID CONTROL VALVES
[75] Inventor: Thomas Gordon Lawson, Birmingham, England
[73] Assignee: Girling Limited, Birmingham, England
[22] Filed: Nov. 29, 1971
[21] Appl. No.: 202,915

[30] Foreign Application Priority Data
Dec. 18, 1970 Great Britain.................. 60218/71
June 11, 1971 Great Britain.................. 27486/71

[52] U.S. Cl........ 137/329.03, 137/505.18, 251/333, 303/6 C
[51] Int. Cl............................................. F16k 1/12
[58] Field of Search..... 137/505.13, 505.18, 329.02, 137/329.03; 303/60; 251/333

[56] References Cited
UNITED STATES PATENTS
2,824,573  2/1958  Mason ........................ 137/505.13
3,314,235  4/1967  Stelzer ......................... 303/6 C X
3,372,706  3/1968  Brice............................ 137/329.03
3,476,443  11/1969 Bratten ......................... 303/6 C X
3,597,009  8/1971  Baldwin ........................ 303/6 C FOREIGN PATENTS OR APPLICATIONS
12,286  0/1910  France ......................... 137/505.13

Primary Examiner—Harold W. Weakley
Attorney, Agent, or Firm—Scrivener Parker Scrivener & Clarke

[57] ABSTRACT

A control valve, for example a pressure reducer valve, has a valve closure member which cooperates with an annular valve seat to seal off a fluid flowpath between the valve closure member and a surrounding annular support member. The support member may have a plurality of inward radial projections and preferably the valve seal has a frusto-conical face for engagement with a sharp-cornered edge of the valve closure member.

7 Claims, 5 Drawing Figures

3,814,121

FLUID CONTROL VALVES

BACKGROUND OF THE INVENTION

This invention relates to fluid-pressure control valves comprising a valve closure member which cooperates in sealing engagement with an annular valve seat of deformable material and an annular support member surrounding the closure member and defining therewith a path for the flow of fluid through the valve, which path in the closed condition of the valve is sealed off by the cooperation of the valve closure member and the valve seat.

In valves of this construction, there is a tendency for the valve seat material to be forced into the flowpath when subjected, in the closed condition of the valve to a higher pressure of that side of the seat remote from the flowpath. This causes undesirable wear, resulting in a reduced seal life.

In order to ensure correct operation of the valve it is desirable to have a knife-edge engagement of the valve closure member and the valve seat. It is known to provide such a knife edge by forming an undercut in the valve closure member, the knife edge so formed engaging a surface of the valve seat which is generally perpendicular to the axis of the closure member. The provision of the undercut in the valve closure member has the disadvantages that it is both time-consuming and expensive to produce.

The valve construction of the present invention overcomes the disadvantages referred to above and affords other features and advantages.

SUMMARY OF THE INVENTION

One object of the invention is to reduce or eliminate the tendency for the valve seat material to be forced into the flowpath.

This object is accomplished, in accordance with a feature of the invention, providing a support member of the control valve with a plurality of inwardly directed radial projections which serve to obstruct axial displacement of the seat material into the flowpath.

However, although this embodiment is suitable for normal working pressures, at very high working pressures the seat material may be forced to an undesirable extent into the flowpath between the support member and the closure member, due to the fact that the seat member is substantially unsupported, in the closed position of the valve in the areas between the serrations.

Thus, in another embodiment, the projections have a substantial circumferential width and define between them relatively narrow fluid flow passages. The support member of this embodiment gives better circumferential support to the seat member and is therefore particularly suitable for working at high pressures. Preferably, the passages between the projections increase in radial depth in a direction away from the sealing member, to assist the fluid flow through the valve and to facilitate production of the support member.

Another object of the invention is to provide a knife-edge engagement of the valve closure member and the valve seal which is both simple and relatively cheap to produce. Thus, according to another feature of the invention the valve seat of the control valve has a generally frusto-conical face for engagement with a substantially sharp-cornered edge of the valve closure member. Preferably, the valve seat is of double, female frusto-conical form presenting one of its faces for engagement by the valve closure member.

BRIEF DESCRIPTION OF THE DRAWINGS.

Two forms of control valve in accordance with the invention are shown in the accompanying drawings, in which.

DESCRIPTION OF THE PREFERRED EMBODIMENT

While the invention is applicable to many kinds of control valve, for the purposes of illustration the invention will be described with respect to brake pressure reducer valves.

Figure 1:
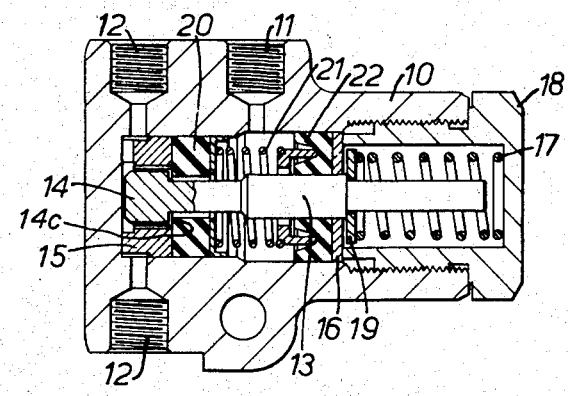
FIG. 1 is an axial cross-section through one embodiment of the valve.

The brake pressure reducer valve shown in FIG. 1 comprises a housing 10 having a stepped bore. A fluid pressure inlet 11 communicates with the larger bore and two fluid pressure outlets 12 communicate with the smaller bore. A valve closure member 13 has a head 14 slidably supported in the stepped bore by the support member 15, and is slidably supported by a support ring 16 at the outer end of the larger bore. A spring 17 acting between an end plug 18 screwed into the right hand end of the housing and a collar 19 loosely mounted on the closure member, biases the closure member to the left. A deformable valve seat 20 in the form of an annular rubber washer is biased into contact with the support member 15 by a spring 21, which at its other end holds a sealing ring 22 in contact with the support ring 16. The sealing ring 22 provides a seal between the housing 10 and the support ring 16 and the closure member 13.

Figure 2:
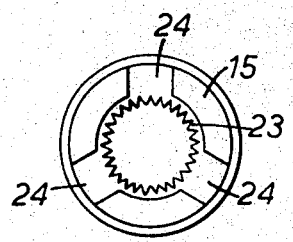
FIG. 2 is an end view of a support member of the valve of FIG. 1.
Figure 3:
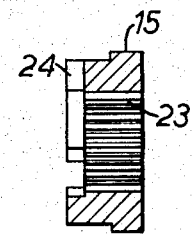
FIG. 3 is a section taken along the line AA of FIG. 2.

The support member 15 is shown in detail in FIGS. 2 and 3 and consists of a generally annular ring preferably made of a sintered material and having a plurality of inwardly directed radial projections in the form of axially extending serrations 23 on its inner surface. The support member fits snugly in the smaller bore of the housing 10, its left-hand end being of reduced diameter and having radial recesses 24 to permit free flow of fluid between the outlets and the clearance between the support member 15 and closure member head 14.

The head 14 of the closure member 13 has a right angular shoulder 14c fits slidably in the central aperture of the support member 15, the serrations 23 supporting the head 14 and also preventing the valve seat 20 becoming trapped in the clearance space between the support member and the closure member. The gaps between the serrations 23 provide a passageway for the hydraulic fluid when the valve is opened.

In operation, hydraulic fluid under pressure is applied to the inlet 11 and the pressure is transmitted through the valve to the outlets 12. When a predetermined pressure is reached (determined by the prestress of the spring 17) the closure member is moved to the right (as seen in FIG. 1) due to the pressure acting on the area of the closure member 13 which is greater than the pressure (normally atmospheric) within the bore in the end plug 18 so that the adjacent annular face of the head 14 engages the valve seat 20, thus closing the valve. Further increase of pressure acts, in a direction to open the valve, on an area equal to the cross-sectional area of the head 14 less the cross-sectional area of the closure member 13 where it passes through the seal 22, the ratio of this area to that of the head 14 determining the ratio between the pressures at which the valve closes and opens. Thus, further increase in pressure once the valve has closed, will reopen the valve. Once the valve reopens the increased pressure acts on the left-hand end of the head 14 and recloses the valve. Thus the valve will open and close allowing the pressure at the outlets 12 to increase at a reduced rate compared with the rate of increase at the inlet 11.

Figure 4:
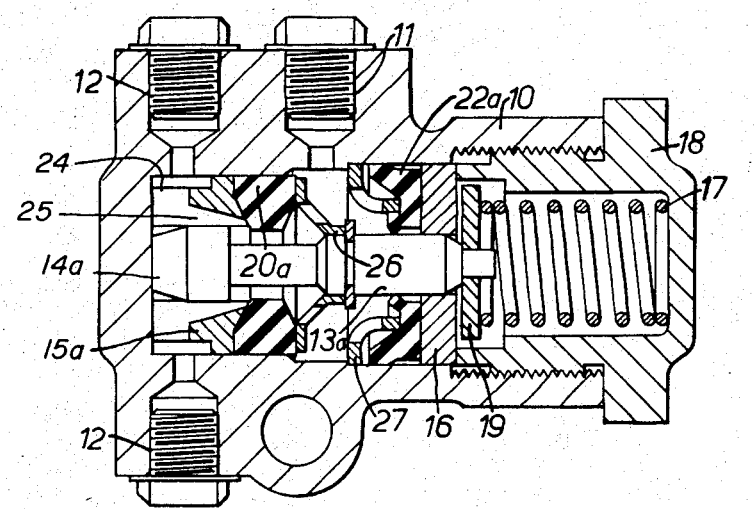
FIG. 4 is an axial cross-section through the second embodiment of the valve.
Figure 5:
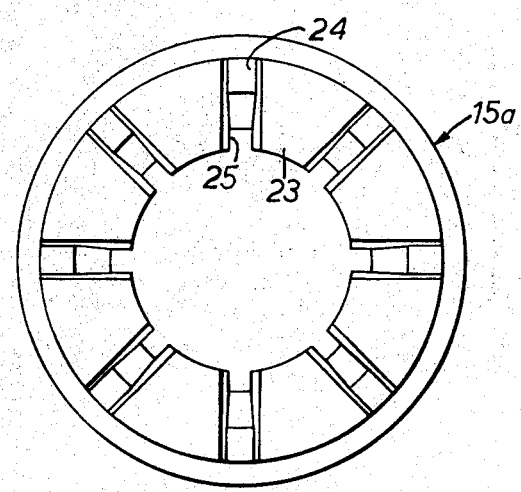
FIG. 5 is an end view of the support member of the valve of FIG. 4.

The embodiment of the brake pressure reducer valve shown in FIGS. 4 and 5 is generally similar in its construction, function and operation to the above-described embodiment, and the same reference numerals, followed by the suffix "a", are used to identify corresponding parts of the valve. In view of the similarity of the two embodiments, only those features of the second embodiment which differ materially from the first embodiment will be described in detail below.

In this embodiment, the valve seat 20a is biased into contact with the support member 15a by a member 26 attached to the closure member 13a, and the sealing ring 20a is held in contact with the support ring 16 by means of a retaining member 27 which abuts a shoulder formed in the stepped bore.

The sintered annular valve support member 15a is formed in its left-hand end face with flow passages in the form of radial recesses 24 communicating with axially directed slots 25. The slots 25 are of generally trapezoidal cross-section and gradually increase in radial depth from the inner right-hand end adjacent the seat 20a. Between the slots 25 there are disposed radially inwardly directed projections 23 of substantial circumferential width.

When the valve is in the open condition, the slots 25 are in fluid communication with the recesses 24 and in the closed condition, when the valve seat 20a is subjected to substantial pressure differences, the valve seat 20a is supported by the projections 23 which thereby resist a tendency for the elastomeric material of which the seat is made to be extruded into the flow passage on the downstream side of the valve.

The valve seat member 20a is of double, female frusto-conical form, presenting one of its conical faces to the piston head 14a of the movable valve member 13a. The head 14 is formed with a substantially sharp-edge corner at its confronting face for sealing engagement with the seal 20a. This arrangement provides a better control of the operating pressure transmitting ratio of the valve.

In each of the above-described embodiments the control spring 17 is positioned outside the valve chamber with the advantages that large control springs can be accommodated without consuming space inside the valve, and that the risk of metallic particles breaking away from the spring and endangering the internal moving parts of the valve is reduced.

Although the invention has been described and illustrated with reference to specific embodiments thereof such description is not intended to be in any way limiting and other variations and modifications within the scope of the appended claims will be apparent to those skilled in the art.

I claim:

1. A fluid flow control valve including a valve body having a bore therein and inlet and outlet ports in said bore, a valve seat of deformable material having a central opening for the passage of fluid therethrough and having an outer periphery sealingly engaging the wall of said bore and opposed sides exposed to the pressures at said inlet and outlet ports, respectively, a valve closure member co-axially engageable with the outlet side of said valve seat to seal off the flow of fluid therethrough, an annular support means surrounding the valve closure member and engaged by the outlet side of said seat, said support means and said closure member defining fluid flow path means in the open condition of said valve, and a plurality of circumferentially spaced, inwardly directed radial projections formed on said support means, said projections engaging the outlet side of said seat radially outwardly of the opening thereof and being constructed and arranged to obstruct the displacement by fluid pressure of the deformable material of said seat into said flow path means.

2. A valve according to claim 1, wherein said support means is a close sliding fit over said valve closure means and the flow path means is constituted by a plurality of separate flow passages formed between said radial projections for the flow of fluid through the valve.

3. A valve according to claim 2, wherein said projections have a substantially greater circumferential width than the fluid flow passages defined between said projections.

4. A valve according to claim 3, wherein said fluid flow passages increase in radial depth in a direction away from said valve seat.

5. A valve according to claim 1, wherein said projections take the form of regular, axially extending splines or serrations.

6. A valve according to claim 1, wherein said valve seat has a generally frusto-conical face and said valve closure means has a substantially sharp-cornered edge for engagement with said frusto-conical face.

7. A fluid flow control valve including a valve body having a bore therein and inlet and outlet ports in said bore, a valve seat of deformable material having a central opening for the passage of fluid therethrough and having an outer periphery sealingly engaging the wall of said bore, and opposed generally frusto-conical faces exposed to the pressures at said inlet and outlet ports, respectively, a valve closure member having an annular substantially sharp cornered edge defined by a right angular shoulder and co-axially engageable with the outlet side of said valve seat to seal off the flow of fluid therethrough, an annular support means surrounding the valve closure member and engaged by the outlet side of said seat, said support means and said closure member defining fluid flow path means in the open condition of said valve, said flow path means being sealed off, in the closed condition of the valve, by the cooperation of the edge of said right angular shoulder of said valve closure member with a frusto-conical face of said valve seat.

* * * * *